INVENTORS
JOHN T. DAVIDSON
ROBERT D. GEORGEN
RAYMOND L. FORTUNE
BY William R. Jacox
ATTORNEY INVENTORS.
JOHN T. DAVIDSON
ROBERT D. GEORGEN
RAYMOND L. FORTUNE
BY Tom Walker
ATTORNEYS 3,044,694
SYSTEM FOR SENSING John T. Davidson and Robert D. Georgen, Dayton, and Raymond L. Fortune, Trotwood, Ohio, assignors to The Standard Register Company, Dayton, Ohio, a corporation of Ohio Filed Apr. 13, 1956, Ser. No. 578,062
8 Claims. (Cl. 235—61.11)

This application is a continuation-in-part of our copending application Serial No. 402,358 filed January 5, 1954 and entitled "Control Unit," now Patent No. 2,870,399.

This invention relates to a control unit for actuating various types of machines, and more particularly to a means for energizing such control unit by the reading or sensing of a code or control mark on a web by sensing means forming a part of the control unit. The web may be in motion or at rest in a located position.

While the control unit embraced in the subject matter hereof is particularly adapted to the control of business machines, such as bookkeeping and adding machines, calculators, punches, tabulators and the like, it may be used for the control of other types of machines with equal facility.

In business systems hitherto, it has been necessary to utilize clerks or operators to transfer data from original records to punched cards, tapes, or other encoded carriers in order to make the data available to such machines as tabulators, calculators, computers and the like. This not only is very expensive, but it multiplies the opportunity for human error. It is a fundamental object of this invention to provide a system and means whereby data from original records may be transferred directly to other business machines such as card punching devices, tabulators, computers and the like.

The system of this invention involves encoding the desired information on the original records and sensing the encoded information therefrom. Business machines, electronic computers, and the like, normally accept data in encoded form, and the code used in our sensing system may be the same as that employed in the machine fed by it. Since, however, it is not always convenient or feasible to encode information on original records in the same code that is employed on the subsequent machines, it is an object of the invention to provide a system and means which will sense information in one code and translate it into electrical impulses which may be used directly to actuate the subsequent machine.

By way of a single example of utility, we currently employ our apparatus to sense encoded information on original sales records such as may be produced on an autographic register, and transfer the information to, say, a card punching machine in impulses suitable for the direct actuation of that machine. Since in most circumstances the original sales records cannot conveniently take the form of punched cards suitable for the actuation of tabulators or computers, it has been necessary to provide, and one of the objects of this invention involves the provision of, a new sensing means and method. In particular, in the practice of this invention, means are provided for the sensing of impressions made on paper or other suitable webs, with ink-like substances by printing, stamping, the use of transfer paper like carbon paper, the use of a ribbon in a typewriter or the like, or marking with a suitable pencil.

Also, since it is necessary to encode a relatively large quantity of information in a relatively very small space on the original records, it has been found desirable to devise, and it is an important object of the invention to provide, purely electronic means for sensing accurately and positively relatively minute marks upon a web as hereinafter set forth.

In the furtherance of this object, it is another object of the invention to provide a control unit which is positively responsive to minute variations deliberately produced in the dielectric effect of a web so that the resultant changes in the capacitance of a sensing means unbalance an otherwise balanced capacitance circuit.

It is an object of the invention to provide a means capable of sensing simultaneously a plurality of prepared areas on a carrier web.

A further object of the invention is to provide means by which the unit can reject unintentional changes in capacitance.

An object of the invention is to simplify the construction as well as the means and mode of operation of control units as disclosed herein, whereby such units may not only be economically manufactured, but will be more efficient and satisfactory in use, adaptable to a wide variety of applications and unlikely to get out of order.

A further object of the invention is to provide a control circuit possessing the advantageous structural features, the inherent meritorious characteristics, and the mode of operation herein mentioned.

With the above primary and other incidental objects in view as will more fully appear in the specification, the invention intended to be protected by Letters Patent consists of the features of construction, the parts and combinations thereof, and the mode of operation, as hereinafter described or illustrated in the accompanying drawings or their equivalents.

Referring to the accompanying drawing, wherein is shown, in schematic diagram, one but obviously not necessarily the only form of embodiment of the invention, FIG. 1 is a diagram of an entire control circuit and its component parts.

Like parts are indicated by similar characters of reference throughout the several views.

*Sensing Circuits*

Figure 1:
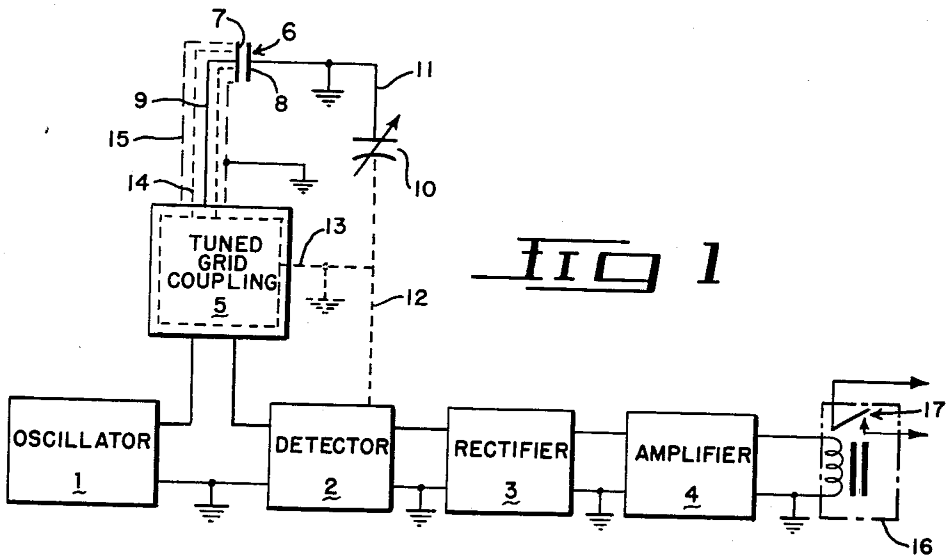

Referring to FIG. 1, an exemplary control unit in accordance with the instant invention may include a balanced capacitance circuit having an oscillator 1, a detector 2, a rectifier 3, and an amplifier 4. The oscillator 1 feeds a radio frequency signal (such as 450–500 k.c.) to the tuned grid circuit of a detector or a radio frequency amplifier 2. Connected into the tuned grid circuit of the detector 2 is a tuned grid coupling unit 5.

As a component part of the coupling unit 5 there is a sensing head, generally designated 6, located externally of the coupling unit. The head 6 comprises generally a capacitor having a pair of spaced plates or electrodes 7 and 8. Electrode 7 is connected to the coupling unit 5 by conductor 9, while plate 8 is connected to ground and may also be connected to a variable capacitor 10 by conductor 11. The other side of the capacitor 10 is coupled to the R.F. ground (the oscillator output level) by conductors 12 and 13. Coupling 12 is connected to the I.F. transformer housing in detector 2, while coupling 13 is tied to a shield surrounding the coupling unit 5.

The lead 9 connecting the external sensing head 6 with the coupling unit 5 is also double shielded, the inner shield being connected to the R.F. ground and the outer shield 15 being grounded.

Since the capacitance change to be sensed by the external head 6 may be on the order of 1 mmfd. (micro-microfarad) or less, it is absolutely necessary to protect the circuit from small variations of capacitance which would interfere with the proper operation. Any stray capacitance change introduced by physical movement of the sensing head 6, as well as line voltage variation must be considered when dealing with an extremely sensitive circuit of this type.

The double shield about lead 9 and the shielded housings about the I.F. transformer and coupling unit 5 are for the purpose of minimizing such stray capacitance change. In addition a well regulated D.C. power supply should be employed to power the circuit. An automatic gain control circuit may also advantageously be used to compensate for relatively slow steady changes such as might be caused by variations in humidity and temperature, or a slow steady change in the balance level of the circuit. The time constant of such automatic gain control circuit is so chosen that, to the utmost extent possible, it will acknowledge intentional change in capacity, but discriminate against other natural or artificial variations.

Variable capacitor 10 is used to provide a minute adjustment of the capacitance of the sensing head 6 to enable accurate balancing of the capacitance circuit under normal operating conditions. Under normal conditions, the output of the balanced circuit is insufficient to energize a sensitive relay 16. However, upon a change in capacitance, although of very small amount, as sensed by the sensing head 6, the output of the amplifier 4 is then sufficient to actuate the sensitive relay 16, the contacts 17 of which may be used to control a work element or some further external circuit connected to the contacts 17.

Figure 7:
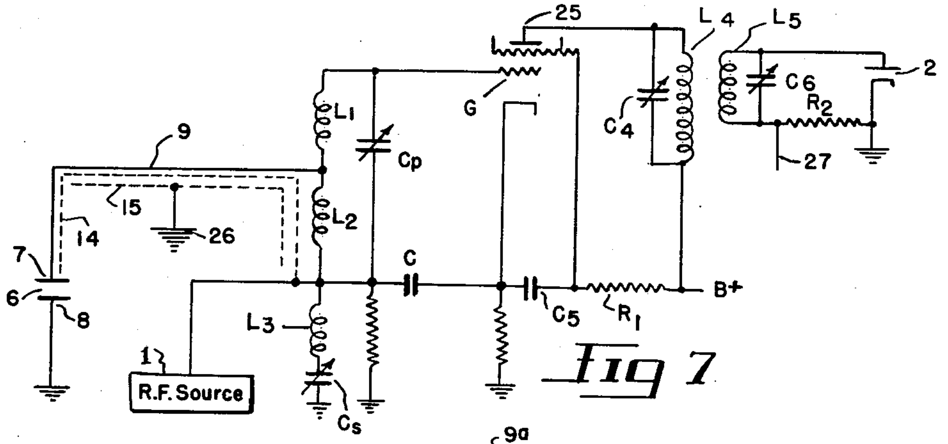
FIG. 7 is a circuit diagram of an individual sensing circuit.

FIG. 7 details an exemplary form of sensing circuit in which like parts have been given like index numerals.

A suitable radio frequency potential is supplied by the oscillator 1, and is connected to the grid G of a radio frequency amplifier 25 through a network comprising series inductances $L_1$ and $L_2$, and parallel variable capacitor $C_p$. The lead 9 of the electrode 7 is connected to the network between the inductances. A radio frequency of 456 kc. is a practical one; but other frequencies may be used.

It should be noted that the outer shield 15 of the sensing head is grounded as at 26, while the inner shield is connected to the R.F. lead from oscillator 1. The network aforesaid is coupled to the cathode of R.F. amplifier 25 through a capacitor C. The plate circuit of the amplifier includes an inductance $L_4$ and variable capacitor $C_4$ in parallel, and is returned to the cathode through a resistor $R_1$ and capacitor $C_5$. The screen grid of the amplifier is connected as shown. Element 25 thus is a tuned-grid, tuned-plate amplifier.

$L_1$, $L_2$ and $C_p$ are tuned to parallel resonance at the R.F. frequency. An R.F. voltage flows through C, $L_2$ and the sensing head and applies potential to the grid G. The signal thus produced is amplified by the amplifier 25 and is transferred to a diode 2 by the tuned coupling means $L_5$, $C_6$. The signal is rectified by the diode and appears as a voltage across the diode load resistor $R_2$. This voltage increases as the capacity at the sensing head increases, and is proportional to the value of the capacity of the sensing head.

Inasmuch as the sensing head, even though shielded, cannot be completely isolated from ground, a certain amount of R.F. current will flow through $L_2$ even though the sensing head is inactive. Moreover, there will be a certain amount of R.F. current so flowing due to stray capacitance of the components to ground. Such current flow will develop an R.F. voltage at G, producing a signal voltage across $R_2$. To control this condition and to insure a proper operating potential at G when a change of capacity occurs at the sensing head, inductance $L_3$ and capacitor $C_s$ have been connected in series between the R.F. lead and ground. $L_3$ is inductively coupled to $L_2$. The flow of current through $L_3$ and $C_s$ induces an R.F. potential in $L_2$ which is opposite to that normally occurring therein. Thus, by controlling the combination $L_3$, $C_s$ the R.F. voltage at G can be reduced to a very low value when the sensing head is inactive, i.e. when it is not sensing a prepared area on a carrier web. When, however, the head senses a prepared area on the web, a substantial signal is produced as aforedescribed.

The signal voltage developed across the resistor $R_2$ may be transferred by lead 27 to a relay 16; but it may also be amplified in pulse form by a D.C. amplifier and presented to the grid of a thyratron tube, as will be understood by the worker in the art.

*The Sensing Head*

Figure 2:
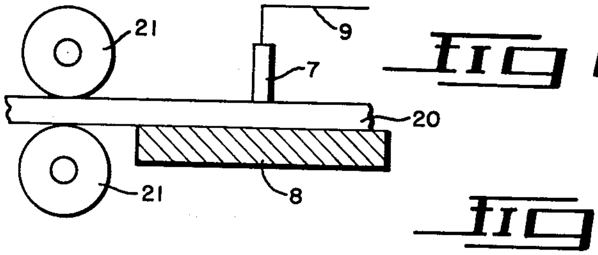
FIG. 2 is a diagrammatic showing of the sensing head under non-actuated conditions, together with feeding means for the strip.
Figure 6:
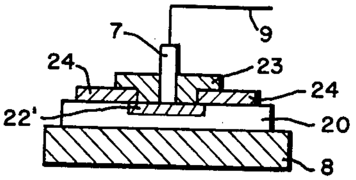

Turning to FIGS. 2 and 6, inclusive, these show diagrammatically several types of sensing heads 6 and their operation. Also shown in these figures is a control strip 20 and its control area.

The upper electrode 7 of the sensing head 6 is formed by the bottom surface of a wire or rod like member, and is of relatively small area. The effective area of the upper electrode 7 is particularly small in relation to the area of the bottom plate 8. The electrodes 7 and 8 are normally held in spaced relation, the spacing being sufficient to permit the free passage of a control strip 20 therebetween. The control strip is preferably although not necessarily of paper, and may comprise either a continuous strip of series connected forms, or may comprise a single sheet or form. Whether of the continuous or single sheet type, the control strip 20 may be either progressively advanced through the sensing head 6 by a feeding device 21, or brought thereby to a predetermined position for sensing.

Located upon the strip 20 is a control area 22, which, when located between the electrodes of the sensing head 6, changes the capacitance thereof, and thereby unbalances the sensing circuit, so that the resultant signal is sufficient to actuate the relay 16 or otherwise affect a work circuit. The control area 22 will normally be a mark made on the web in a predetermined laterally and longitudinally located position, as hereinafter more fully outlined. The mark is capable of affecting the dielectric characteristics of the web, and hence produces a change in the capacity of the sensing head when the mark is located between the electrodes of the head.

The invention may be practiced by moving a web continuously between the electrodes of the head, so that a signal is produced whenever a mark or control spot comes between the electrodes. However, another mode of operation, of particular value where a multiple head is used, involves moving the web, strip or sheet to a predetermined position for sensing a plurality of marks, and then sensing the presence or absence of such marks simultaneously by means of a common electrode 8 and a plurality of the probes or electrodes 7 each connected to its own sensing and work circuits. In such a case it will be normal to separate the electrodes during travel of the web, and then bring them against the web during the actual operation of sensing.

Figure 3:
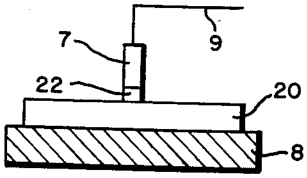
FIG. 3 is a view showing the sensing head under actuated condition.
Figure 4:
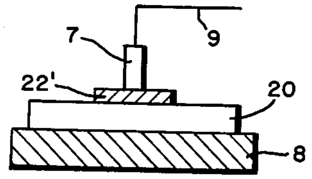
FIGS. 4, 5 and 6 are similar to FIGS. 2 and 3, but showing another form of sensing head, or control area, or both.

FIG. 2 illustrates a condition in which no control spot is located between the electrodes 7 and 8; no effective signal will be generated; and no work circuit will be energized. FIG. 3 is illustrative of a condition in which the electrode 7 contacts a control spot or area 22 on the web 20. The capacitance between electrodes 7 and 8 is thereby altered; a signal will be generated, and a work circuit will be energized. The control spot has been shown as of approximately the same area as the sensing end of the probe or electrode 7. In FIG. 4 the control spot 22' is shown as having greater area than the end of the probe 7.

Figure 5:
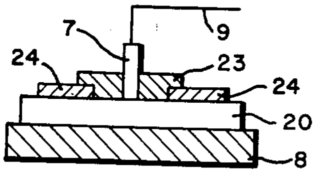

FIGS. 5 and 6 show a further modification of the head 6 in which the effective area of the electrode 7 (hereinafter referred to as a probe) is greatly increased by the passage of the control area 22'. In this modification the effective area of the probe 7 becomes considerably greater than the control area 22'. Surrounding the probe 7 is an insulating member 23. In surrounding relation to the insulating member 23 is a metal plate 24, the probe 7, insulating member 23 and plate 24 comprising a unitary structure. In the absence of a spot 22' the plate 24 is insulated from the probe 7, and consequently has no effect upon the probe 7 or the capacitance of the sensing head.

The size of the insulating member 23 is slightly smaller than the size of the control area 22'. Thus when the control area 22' passes through the sensing head it momentarily couples the probe 7 and the surrounding auxiliary plate 24 to form a greatly enlarged upper plate as shown in FIG. 6. The capacitance of the head 6 is therefore altered due to the change in effective plate area.

Because the apparatus shown herein is effective for the sensing of very small control marks, it becomes possible to utilize multiple sensing heads and to sense simultaneously a large quantity of information in encoded form. This is diagrammatically illustrated in FIGS. 8 and 9 wherein the web 20 is shown as lying above a common grounded electrode 8 and wherein a plurality of the probes or electrodes 7, **7*a*, etc. is shown as mounted in a common head or holder 28. Each probe has its own lead 9, 9*a*, etc. connected to its own sensing circuit like that, say, of FIG. 7. The head or holder 28** may be of insulative substance so as to insulate the several probes from each other; and provision may be made in the head for shielding them from each other. The number of electrodes may be multiplied in both directions to whatever extent is desired so that in normal practice a single head may carry a very large number of the probes depending on the service to which the device is to be put. The individual leads will be shielded as hereinabove taught.

Figure 8:
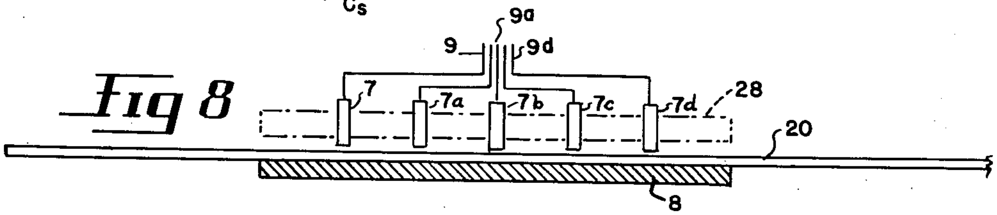
FIG. 8 is a diagrammatic showing of a multiple sensing head.
Figure 9:
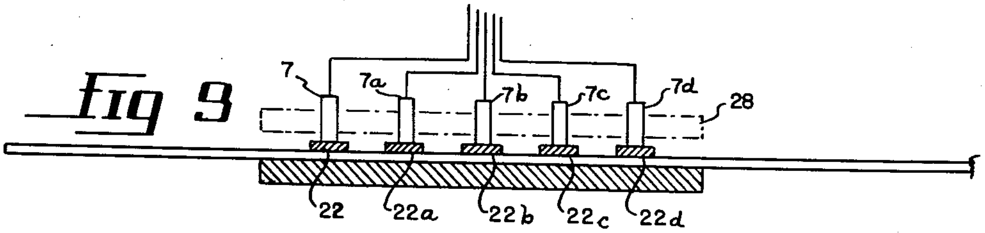
FIG. 9 is a diagrammatic showing of the head in the operation of sensing.

As indicated in FIG. 8, the electrodes will normally be separated during any movement of the web 20, either by raising the head 28 or lowering the common electrode 8, or both. The web 20 will be moved by suitable means to a predetermined position, whereby the electrodes will be brought against the web as indicated in FIG. 9. In that figure a plurality of the control spots is indicated at 22, **22*a*, etc.; and it will generally be the practice to bring the probes 7, 7*a***, etc. into contact with them. In the way indicated, the apparatus may be used for the simultaneous sensing of the presence or absence of a very large number of control spots.

*Control Spots or Areas*

The control areas 22 or the like are not conductive in the sense that they provide a circuit for the direct flow of current from electrode 7 to electrode 8 through the strip 20. It is only necessary that the control area or spot be capable of changing the dielectric effect of the web lying between the electrodes 7 and 8 so as to change the capacity between the electrodes. While the control areas or spots have been illustrated in the diagrammatic drawings of this application as constituting bodies superposed on and lying above the web, they need not necessarily be of this character since the control areas or spots may be partially or wholly absorbed into the web. They may be formed of any material applied to the web which is capable of effecting a detectable change in the web's dielectric constant; or they may be made of any material which is capable of producing the effect of a change in area in the opposed portions of the coacting electrodes. In the latter event the control spots will normally be larger than the ends of the probes 7 and will at least contain an electrically conductive material, although it is not necessary that they contain so much of this material that they have a relatively low ohmic resistance.

Since the capacity of a condenser is determined by multiplying the area of the smallest effective plate by the value of the dielectric between the plates and dividing this product by the distance between the plates, it will be seen that any change in the dielectric value (FIGS. 3, 4 and 6) or any change in effective plate area (FIGS. 4, 6, 8 and 9), or any combination thereof, will alter the capacity between the electrodes of the sensing head.

The marking substance may be in the form of an ink, and the control spots or areas may be imposed on the web by ordinary printing. Where a large number of forms are to carry the same control spots, in part at least, printing is often resorted to. It is also possible to use the marking substance in the form of a pencil or the like with which an operator can form control spots or areas in predetermined locations. Another excellent way of forming control spots or areas is by the employment of stamping means operating on the web through a transfer sheet bearing a coating of suitable substance and operating in a way analogous to the carbon paper of a typewriter or an autographic register, or operating by means of an inked ribbon.

As indicated, the marking substance may consist of nothing more than a vehicle and a relatively permanent material capable of changing the dielectric effect of the web. For permanence, the marking material should be capable of producing a localized and well-defined mark of permanent character; but it is not necessary that the mark be visible to the eye. While other substances will serve, materials which in themselves have measurable electrical conductivity are convenient to use in combination with vehicles and bodying materials. Of the substances which have electrical conductivity, the most readily available are graphite and various metallic powders.

The control areas or spots may be arranged in various ways; but it is usual in employing this arrangement to organize the control areas or spots in accordance with a predetermined code. The nature of the code is not a limitation on the invention. A code of the 1–2–4–7 type as known in the art is a convenient one for use because it facilitates the encoding of digits from 1 to 9 with a minimum of spot positions and a minimum of control circuits per digit. Other codes and other code types may be employed.

*Exemplary Use of the Invention*

One of the uses to which this invention is excellently adapted is the transferring of data from original sales records to business machines which may be card punchers, tabulators, computers, and the like. The original sales records may be such records as are made out in the first instance by hand on an autographic register or on a typewriter, and may take the form of statements of account. Hitherto it has been necessary to collect the original sales records and then employ a staff of clerks or operators to transfer information from them to a card punching device or tape machine before other business machines could be fed the information.

In the practice of the present invention, it is only necessary that the original sales records be caused to carry the desired information in encoded form. This is not difficult and does not require any great percentage of the operator's time. Some of the encoded information, which will not vary from transaction to transaction, may be imprinted on the sales records by a previous operation. Code symbols for the customer's name, address, account number, and other information concerning him may be imprinted on the sales record through the medium of an embossed metal plate, carried by the customer or his representative and used with suitable stamping apparatus to produce a code imprint on the sales record through the medium of such a transfer paper as that described above.

Figure 10:
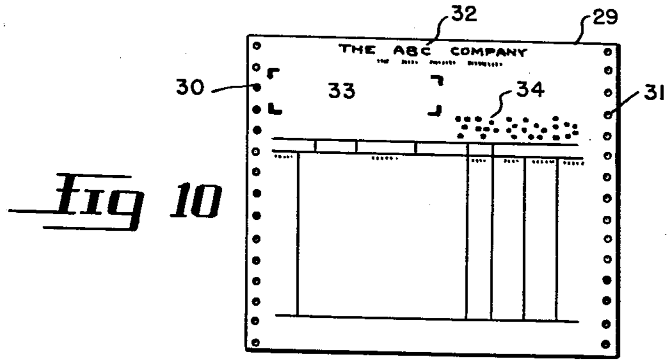
FIG. 10 is a diagrammatic showing of one form of an original record with encoded information.

FIG. 10 shows at 29 an original sales record form suitable for use either on a typewriter or in an autographic register. Series of perforations 30 and 31 are shown on either side of the form. By means of these perforations, the form may be fed (with other forms for copies) over the platen of a typewriter or over the writing surface of the autographic register. These perforations may also serve at a later period to locate the form with reference to one or more sensing heads during the sensing operation, or the form may be otherwise located as desired.

The form will usually carry the name and address of the organization issuing it, as at 32; and it will also contain columns and spaces for various indicia including such matters as quantity and identification of items sold, prices, the total amount due, and the like. In a space marked 33, the customer's name and address in legible form, together with the customer information referred to above, in encoded form, may be imprinted in a single operation by means of an embossed metal plate carried by the customer. A space 34 is also provided for the encoding of other information by means of control spots or areas, some of which are shown in the figure. A wide variety of arrangements is possible. By way of example, in one arrangement spaces are provided for a consecutive number of seven digits, an amount number of seven digits, an account number, an item number, and special information and control data.

Devices have been made both for typewriters and for autographic registers by means of which (through the actuation of certain keys or operating elements) the operator can print or set up the required information in encoded form while entering the information on the sales record either in handwriting or in typing. When the record is otherwise finished in an autographic register, a lever may be thrown to imprint the encoded information on the record in the area 34 by means of the control spots which have been described.

The original sales records and the copies thereof are then available for all of the uses to which such documents have heretofore been put. When it becomes necessary, however, to transfer the encoded information thereon to other business machines, the original sales records are fed sequentially to predetermined positions between one or more sensing heads such as those described in connection with FIGS. 8 and 9 hereinabove. When an individual sales record has been accurately located, the electrodes are brought against it, either by lowering the multiple probe head, or raising the common electrode 8, or both, and a plurality of sensing operations occurs, detecting the presence or absence of control spots or areas in predetermined location on the sales record which, of course, constitutes the web 20. In this way, a plurality of work circuits is energized selectively. These work circuits may be connected for the direct operation of other business machines, as for example, card or tape punching devices.

Where a code is employed in which certain at least of the digits are represented by the simultaneous actuation of more than one control circuit, translation from the encoded form to some other encoded form, or to an arrangement in which there is a separate circuit for each digit or information unit, may be accomplished by causing the various output or work circuits hereinabove described to actuate suitable relay networks, forming no limitation on the present invention.

The various sensing circuits hereinabove described will normally be combined in a suitable cabinet containing power packs and the like. The cabinet may also contain other apparatus such, for example, as memory units, indicating devices, means for effecting sequential operations, control means, and the like. These also form no limitation on the present invention.

It is within the purview of the present invention, however, to sense or detect encoded information on various parts of a form or record by means of a plurality of sensing heads operating either simultaneously or sequentially, and to sense various parts of an area imprinted with encoded information sequentially by means of the same head, moving either the head or the record between sensing operations.

Modifications may be made in the invention without departing from the spirit of it. Having thus described the invention in certain exemplary embodiments, what is claimed as new and desired to be secured by Letters Patent is:

1. Sensing apparatus for a web having coded portions comprising a capacity sensing device, a radio frequency oscillator, a radio frequency amplifier having a grid, tuned means for transferring to the grid of said amplifier a radio frequency potential from said oscillator, a connection between said tuned means and said sensing device such that the potential so applied to the tuned means varies with the capacity of said sensing device, and means for generating in said tuned means a radio frequency potential opposed to said grid potential, and means for adjusting the last mentioned means to compensate for the capacity of said sensing device as determined by the dielectric effect of said web alone.

2. Sensing apparatus for a web having coded portions comprising a capacity sensing device, a radio frequency oscillator, a radio frequency amplifier having a grid, tuned means for transferring to the grid of said amplifier a radio frequency potential from said oscillator, a connection between said tuned means and said sensing device such that the potential so applied to the tuned means varies with the capacity of said sensing device, and means for generating in said tuned means a radio frequency potential opposed to said grid potential, and means for adjusting the last mentioned means to compensate for the capacity of said sensing device as determined by the dielectric effect of said web alone without a coded portion, and rectifying means having connection with said radio frequency amplifier and acting to produce a direct current signal when said amplifier grid is energized.

3. A sensing device for a web having a coded portion which changes the web dielectric, comprising an amplifier having a control element, a tuned circuit connected to the control element of the amplifier, oscillator means connected to the tuned circuit and providing a substantially constant frequency and voltage thereto, a sensing capacitor conected to the tuned circuit, the sensing capacitor having a pair of spaced-apart plates, the web being movable between the plates, load impedance means coupled to the amplifier, the voltage across the load impedance means being dependent upon the output of the amplifier, a work element connected to the load impedance, the amplifier causing a voltage across the impedance sufficient to operate the work element when the coded portion of the web is positioned between the plates of the capacitor, the amplifier impressing a voltage across the impedance which is less than sufficient to operate the work element when the web without the coded portion is positioned between the plates of the capacitor.

4. A device for sensing a strip having a coded portion which changes the dielectric of the strip, comprising an amplifier circuit including an electronic valve member having a grid, a first coil connected to the grid, a second coil connected in series with the first coil, a variable capacitor connected across the series of two coils, a sensing capacitor having two plates, one plate being connected to a point between the first and second coils, the other plate being connected to ground, an oscillator connected to the second coil at the end opposite the first coil, a third coil, the third coil having one end thereof connected to the juncture of the second coil and the oscillator, the other end of the third coil being conected to ground, the third coil having an opposed coupling with the second coil so that current flow through the third coil opposes current flow through the second coil, the strip being disposed between the plates of the sensing capacitor, the grid of the valve being at a given potential when a non-coded portion of the strip is disposed between the plates of the sensing capacitor, the grid being at a different potential when the coded portion of the strip is disposed between the plates of the sensing capacitor due to the fact that the capacitance of the sensing capacitor is changed with the coded portion of the strip being between the plates.

5. In a device for sensing a web having a coded portion which changes the dielectric thereof, a control circuit, the control circuit including tuned means, an amplifier having a control element conected to the tuned means and responsive to the voltage thereof, a source of substantially constant frequency connected to the tuned means, a work element connected to the amplifier of the control circuit for operation thereby, a sensing head comprising spaced electrodes between which said web is located, means connecting the sensing head to the tuned means of the control circuit so that the tuned means senses changes in capacitance of the sensing head, said coded portion of the web when located between said electrodes altering the capacitance of said sensing head whereby to change the voltage applied to the control element of the amplifier by the tuned means.

6. Sensing apparatus for a web having coded portions comprising a capacity sensing device, a radio frequency oscillator, a radio frequency amplifier having a control element, tuned means for transferring to the control element of said amplifier a radio frequency potential from said oscillator, connection means between said tuned means and said sensing device such that the potential so applied to the tuned means varies with the capacity of said sensing device, and means for generating in said tuned means a radio frequency potential opposed to the potential applied to the control element.

7. Sensing apparatus for a web having coded portions comprising a capacity sensing device, a radio frequency oscillator, a radio frequency amplifier having a control element, tuned means for transferring to the control element of said amplifier a radio frequency potential from said oscillator, and connection means between said tuned means and said sensing device such that the potential so applied to the tuned means varies with the capacity of said sensing device.

8. In a device for sensing a web having a restricted deposit of material applied thereto, a pair of spaced-apart electrodes, there being an electrode on each side of said web, said electrodes forming a capacitative couple, with said web acting as a dielectric therebetween, the restricted deposit of material being applied to a portion of said web which is movable to a position between said electrodes to alter the capacitative coupling therebetween, a work unit sensitive to the voltage applied thereto, a sensing circuit in connection with said work unit, the sensing element including tuned means, an oscillator connected to the tuned means of the sensing circuit and supplying substantially constant radio frequency voltage thereto, means connecting said electrodes to the tuned means so that changes in capacitance of the electrodes changes the voltage applied to the work unit by the sensing circuit, and means to move at least one of said electrodes transversely of the plane of said web whereby selectively to release said web for movement and to clamp said web between said electrodes.

References Cited in the file of this patent

UNITED STATES PATENTS

| | | |
|---|---|---|
| 1,855,569 | Chireix | Apr. 26, 1932 |
| 1,905,332 | Barbulesco | Apr. 25, 1933 |
| 1,980,816 | McDill | Nov. 13, 1934 |
| 2,094,351 | Draper et al. | Sept. 28, 1937 |
| 2,294,681 | Moon | Sept. 1, 1942 |
| 2,512,879 | Roggenstein | June 27, 1950 |